(12) United States Patent
Aoki

(10) Patent No.: US 7,531,145 B2
(45) Date of Patent: May 12, 2009

(54) HONEYCOMB STRUCTURE

(75) Inventor: Yoichi Aoki, Ama-gun (JP)

(73) Assignee: NGK Insulators, Ltd., Nagoya (JP)

( * ) Notice: Subject to any disclaimer, the term of this patent is extended or adjusted under 35 U.S.C. 154(b) by 533 days.

(21) Appl. No.: 10/472,274

(22) PCT Filed: Mar. 20, 2002

(86) PCT No.: PCT/JP02/02643

§ 371 (c)(1),
(2), (4) Date: Sep. 22, 2003

(87) PCT Pub. No.: WO02/076579

PCT Pub. Date: Oct. 3, 2002

(65) Prior Publication Data

US 2004/0093858 A1  May 20, 2004

(30) Foreign Application Priority Data

Mar. 22, 2001  (JP)  ............... 2001-083736

(51) Int. Cl.
B01J 8/02 (2006.01)
F01N 3/022 (2006.01)
F01N 3/08 (2006.01)

(52) U.S. Cl. ............... 422/180; 422/222; 55/523; 55/524; 55/DIG. 30

(58) Field of Classification Search ............... None
See application file for complete search history.

(56) References Cited

U.S. PATENT DOCUMENTS 4,335,783 A   6/1982  McBrayer et al.
4,353,854 A * 10/1982  Oyamada et al. ............ 264/631
4,849,399 A   7/1989  Joy, III et al.

FOREIGN PATENT DOCUMENTS

| EP | 1 291 061 A1 | 3/2003 |
| JP | B2 61-51240 | 11/1986 |
| JP | A 63-240921 | 10/1988 |
| JP | U 5-50022 | 7/1993 |
| JP | A 7-241422 | 9/1995 |

(Continued)

OTHER PUBLICATIONS

Suresh T. Gulati, Corning Glass Works Corning, NY, "Strength and Thermal Shock Resistance of Segmented Wall-Flow Diesel Filters", 860008, pp. 11-18.

*Primary Examiner*—Jennifer A Leung
(74) *Attorney, Agent, or Firm*—Oliff & Berridge, PLC

(57) ABSTRACT

A honeycomb structure wherein a plurality of honeycomb segments (1) each having a large number of through-holes surrounded by partition walls and extending in the axial direction of the segment are bonded at the sides of the honeycomb segments (1) parallel to said axial direction (X) and integrated, the honeycomb structure being characterized in that, in its section perpendicular to said axial direction (X), the shortest distance (L1) from the gravity center of the section to the bonded areas (5) of honeycomb segments in the section is $\frac{1}{10}$ or less of the largest distance (L2) from the gravity center of the section to the circumference (9) of the section. This honeycomb structure hardly generates cracks caused by the thermal stress appearing therein during the use and is superior in durability.

9 Claims, 16 Drawing Sheets

FOREIGN PATENT DOCUMENTS

| | | |
|---|---|---|
| JP | A 08-28246 | 1/1996 |
| JP | 2000007455 A * | 1/2000 |
| JP | A 2000-210217 | 8/2000 |
| JP | A 2000-279729 | 10/2000 |
| JP | A 2002-60279 | 2/2002 |

* cited by examiner

PRIOR ART

HONEYCOMB STRUCTURE

TECHNICAL FIELD

The present invention relates to a honeycomb structure used in, for example, an exhaust gas purifier of a heat engine (e.g. an internal combustion engine) or a burner (e.g. a boiler), or in a reformer of a liquid fuel or a gaseous fuel. More particularly, the present invention relates to a honeycomb structure which hardly generates cracks during the use and which is superior in durability.

BACKGROUND ART

Honeycomb structures have been used in, for example, an exhaust gas purifier of a heat engine (e.g. an internal combustion engine) or a burner (e.g. a boiler), or in a reformer of a liquid fuel or a gaseous fuel. It is known that honeycomb structures are also used to capture and remove a particulate substance present in a particle-containing fluid, for example, an exhaust gas emitted from a diesel engine.

In the honeycomb structure used for such a purpose, the sharp temperature change of exhaust gas and the local heating tend to make non-uniform the temperature distribution inside the honeycomb structure, which has caused problems such as crack generation in honeycomb structure and the like.. When the honeycomb structure is used particularly as a filter for capturing a particulate substance in an exhaust gas emitted from a diesel engine, it is necessary to burn the fine carbon particles deposited on the filter to remove the particles and regenerate the filter and, in that case, high temperatures are inevitably generated locally in the filter; as a result, a big thermal stress and cracks have tended to generate.

Honeycomb structures have become larger depending upon the application purpose. Hence, it is known to produce a larger honeycomb structure by bonding a plurality of honeycomb segments 1, as shown in FIG. 12. In this case as well, it is necessary to reduce the thermal stress generated.

As a means for reducing the thermal stress, there is disclosed in, for example, U.S. Pat. No. 4,335,783, a process for producing a honeycomb structure, which comprises bonding a large number of honeycomb parts using a discontinuous adhesive.

Also in JP-B-61-51240 is proposed a heat shock-resistant rotary regenerating heat exchanging method which comprises forming, by extrusion, matrix segments of honeycomb structure made of a ceramic material, firing them, making smooth, by processing, the outer peripheral portions of the fired segments, coating the to-be-bonded areas of the resulting segments with a ceramic adhesive having, when fired, substantially the same mineral composition as the matrix segments and showing a difference in thermal expansion coefficient, of 0.1% or less at 800° C., and firing the coated segments.

Also in a SAE article 860008 of 1986 is disclosed a ceramic honeycomb structure obtained by bonding cordierite honeycomb segments with a cordierite cement.

Further in JP-A-8-28246 is disclosed a ceramic honeycomb structure obtained by bonding honeycomb ceramic members with an elastic sealant made of at least a three-dimensionally intertwined inorganic fiber, an inorganic binder, an organic binder and inorganic particles.

The aim of the present invention is to provide a honeycomb structure which hardly generates cracks caused by the thermal stress appearing therein during the use and which is superior in durability.

DISCLOSURE OF THE INVENTION

In the present invention, an investigation was made from a viewpoint entirely different from the prior art, and it was found that by constituting a honeycomb structure so that one of the bonded areas thereof passes near the gravity center of a section of the honeycomb structure perpendicular to the axial direction of the honeycomb structure, the honeycomb structure is low in the thermal stress appearing therein during the use and hardly generates cracks. The present invention has been completed based on the above finding.

That is, the present invention provides a honeycomb structure wherein a plurality of honeycomb segments each having a large number of through-holes surrounded by partition walls and extending in the axial direction of the segment are bonded at the sides of the honeycomb segments parallel to said axial direction and integrated, characterized in that, in its section perpendicular to said axial direction, the shortest distance (L1) from the gravity center of the section to the bonded areas of honeycomb segments in the section is $\frac{1}{10}$ or less of the largest distance (L2) from the gravity center of the section to the circumference of the section.

In the present invention, the expression "gravity center of section" means a centroid of a honeycomb structure section perpendicular to axial direction. Also in the present invention, the expression "axial direction" means a direction parallel to through-holes (an X direction in FIG. 1). In the following, the expression "section" means, unless otherwise specified, a section of honeycomb structure perpendicular to axial direction.

BRIEF DESCRIPTION OF THE DRAWINGS

FIG. 13(a) is a perspective view of the honeycomb structure and FIG. 13(b) is a top view showing its end.

FIG. 14(a) is a perspective view of the honeycomb structure and FIG. 14(b) is a top view showing its end.

FIG. 15(a) is a perspective view of the honeycomb structure and FIG. 15(b) is a top view showing its end.

FIG. 16(a) is a perspective view of the honeycomb structure and FIG. 16(b) is a top view showing its end.

BEST MODE FOR CARRYING OUT THE INVENTION

Embodiments of the honeycomb structure of the present invention are described below with reference to the accompanying drawings. However, the present invention is in no way restricted to these embodiments.

Figure 1:
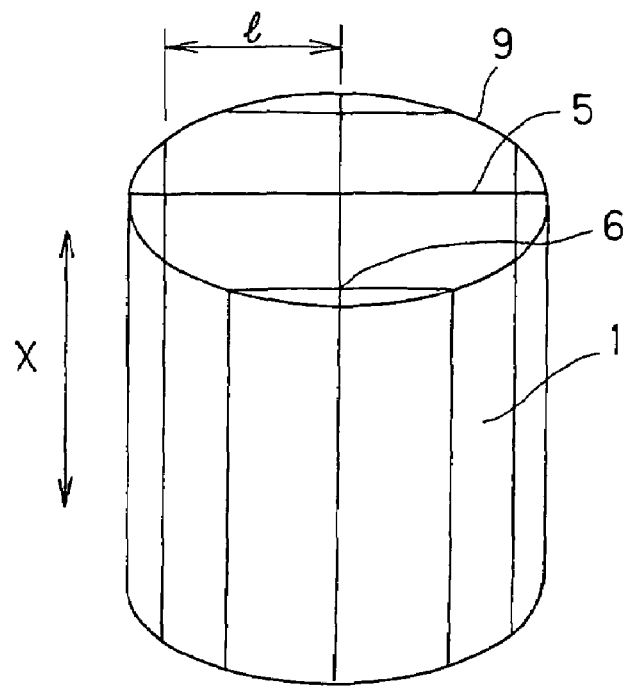
FIG. 1 is a perspective view showing one embodiment of the honeycomb structure of the present invention.

FIG. 1 shows one embodiment of the honeycomb structure of the present invention. In the honeycomb structure of the present invention, a plurality of honeycomb segments 1 are bonded at their sides parallel to the axial direction (X) of honeycomb segment, using an adhesive, whereby bonded areas 5 are formed.

Figure 2:
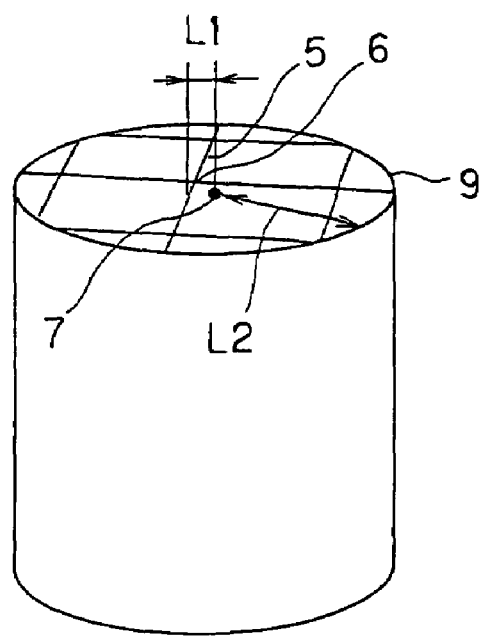
FIG. 2 is a perspective view showing a section of the honeycomb structure of FIG. 1.
Figure 3:
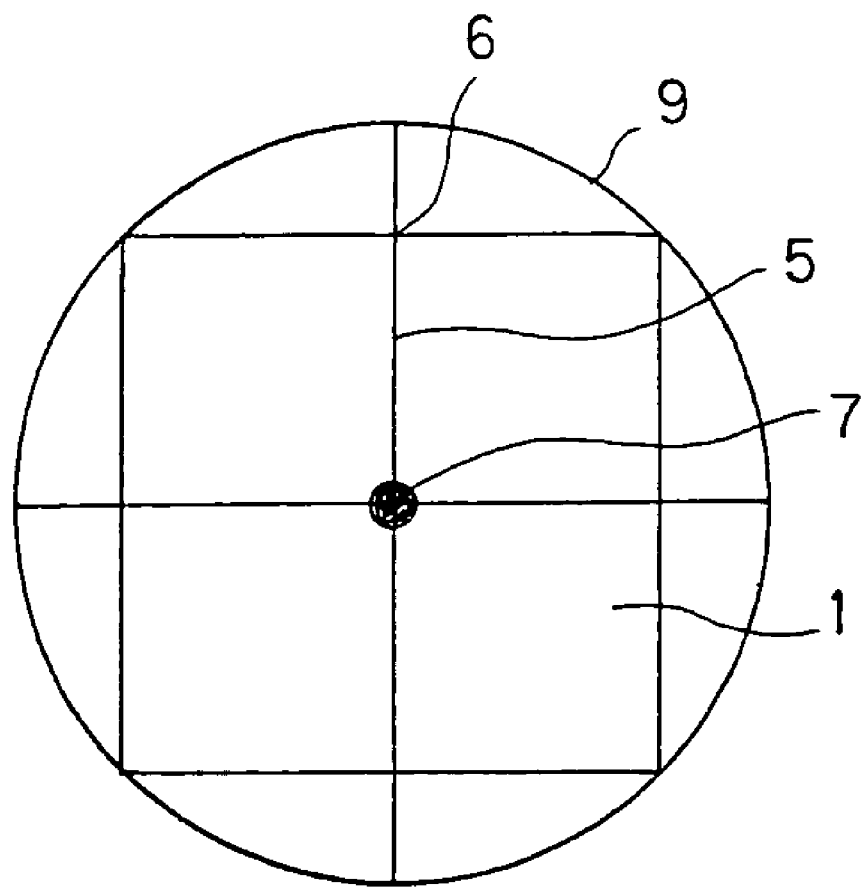
FIG. 3 is a sectional view of the honeycomb structure produced in Example 1.

FIG. 2 shows, in a section of the honeycomb structure of FIG. 1, a relation between the gravity center and the bonded areas 5. The important characteristic of the present invention is that, as shown in FIG. 2, the shortest distance (L1) from the gravity center 7 of the section to the bonded areas 5 of the section is 1/10 or less, preferably 1/20 or less, further preferably 1/30 or less, more preferably 1/40 or less of the largest distance (L2) from the gravity center 7 of the section to the circumference 9 of the section. Most preferably, L1 is 0, that is, the bonded areas 5 pass the gravity center 7, as shown in FIG. 3. Since the bonded areas 5 pass near the gravity center 7 of the section, most preferably on the gravity center 7, the thermal stress appearing around the center of the section during the use or regeneration of honeycomb structure is liberated, the stress of the whole honeycomb structure is kept low, and generation of cracks is suppressed. In the present invention, it is further preferred that an intersection 6 of the bonded areas 5 is near the gravity center of the section or preferably on the gravity center.

As to the sectional shape of the honeycomb structure of the present invention, there is no particular restriction. Various shapes such as circle, ellipse, race track and the like, and various sizes can be used as shown in FIGS. 6(a) to 6(e), FIGS. 7(f) to 7(i), FIGS. 8(j) to 8(l), FIGS. 9(m) to 9(o), FIG. 10 and FIGS. 11(q) and 11(r). In these shapes as well, since the bonded areas pass near each gravity center as shown in FIG. 6(a) to FIG. 11(r), the thermal stress appearing in the vicinity of the central axis during the use is liberated, the stress of the whole honeycomb structure is kept low, and generation of cracks is suppressed. Incidentally, the dimensions in FIG. 7(f) to FIG. 9(o) are simply for reference, and the honeycomb structure of the present invention is in no way restricted to these dimensions.

The number of the honeycomb segments used in the honeycomb structure of the present invention can be selected freely depending upon the size of honeycomb structure, etc. The number is at least 2 or more, preferably 3 or more, further preferably 5 or more.

Figure 4A:
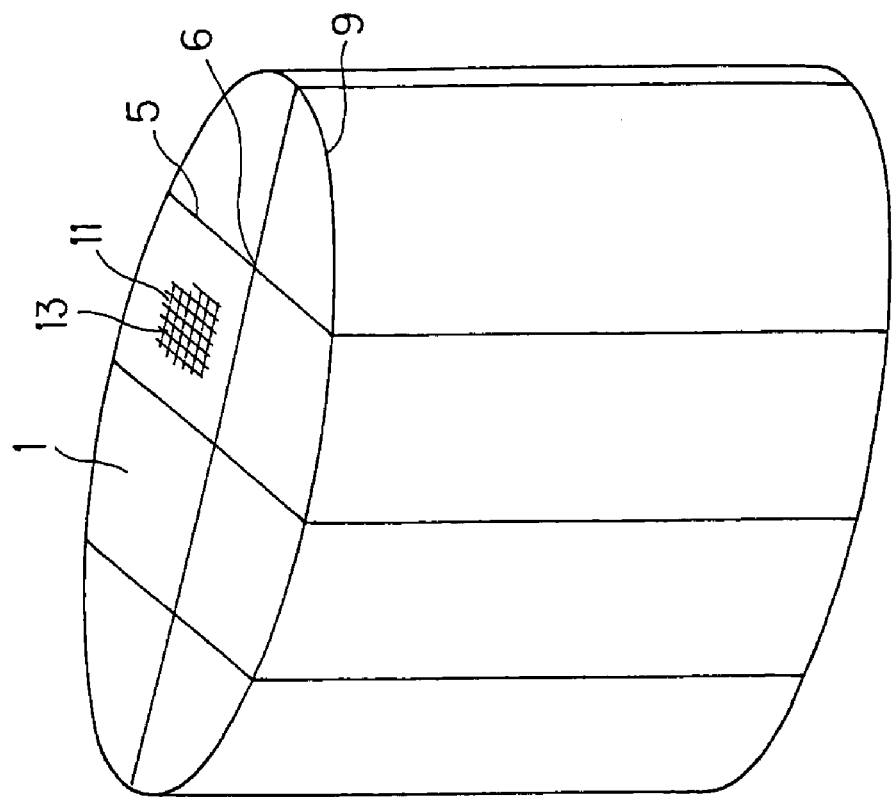
FIGS. 4(a) and 4(b) are each a perspective view showing other embodiment of the honeycomb structure of the present invention.
Figure 4B:
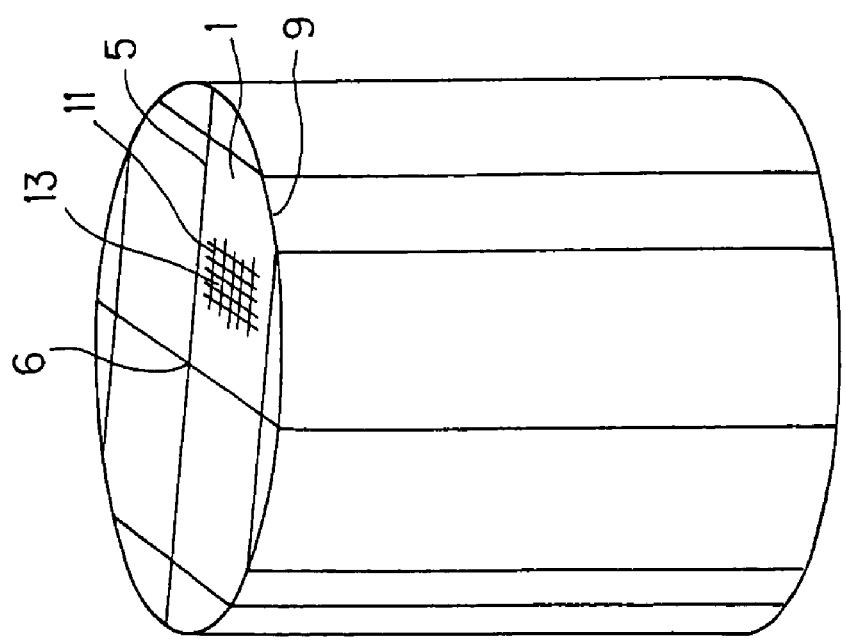
Figure 5:
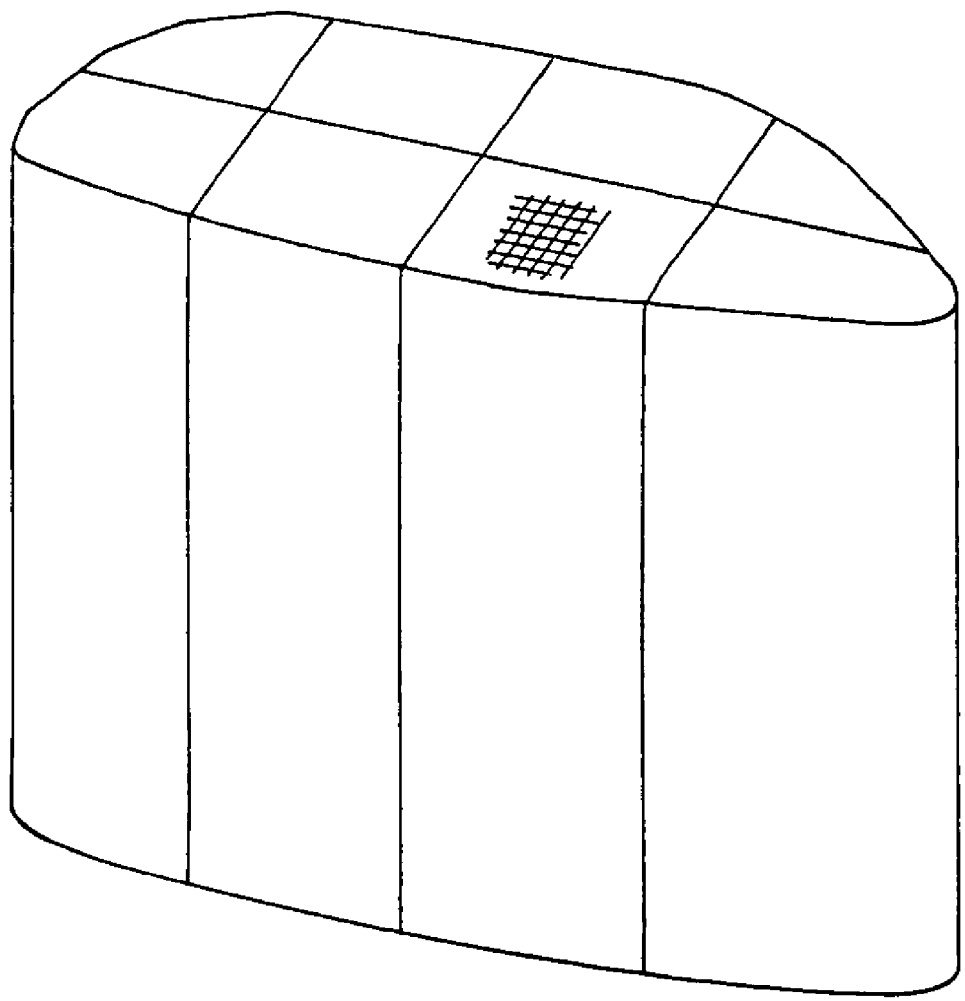
FIG. 5 is a perspective view showing still other embodiment of the honeycomb structure of the present invention.
Figure 6C:
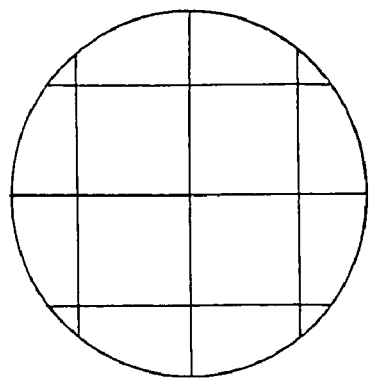
FIGS. 6(a) to 6(e) are each a sectional view showing an example of the sectional shape of the honeycomb structure of the present invention.
Figure 6E:
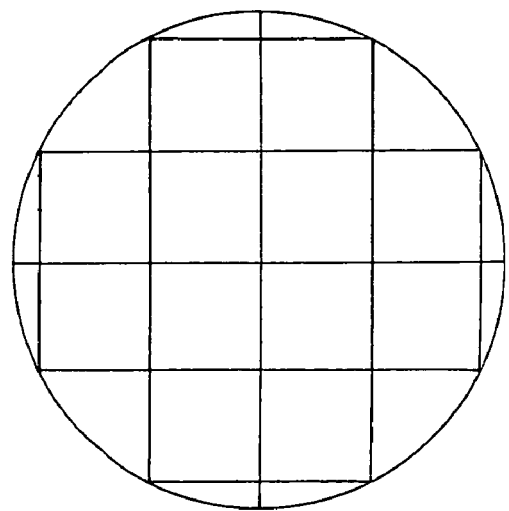
Figure 6B:
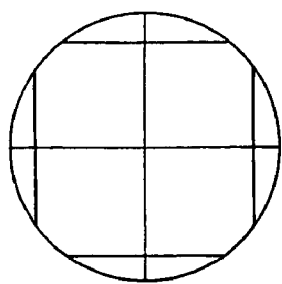
Figure 6A:
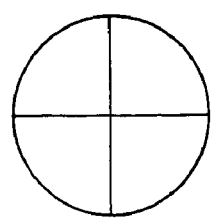
Figure 6D:
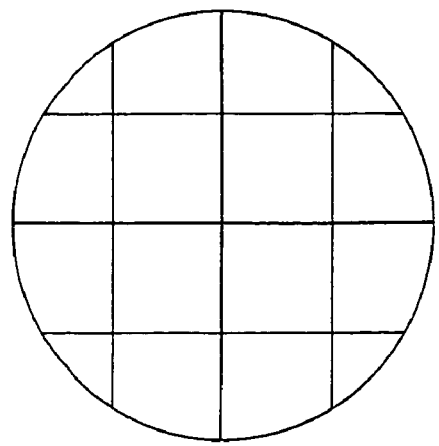
Figure 7G:
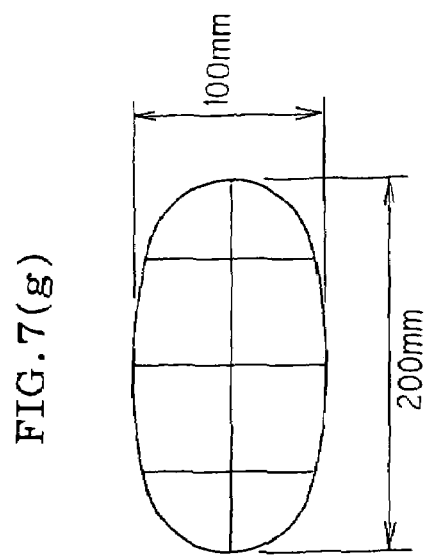
FIGS. 7(f) to 7(i) are each a sectional view showing an example of the sectional shape of the honeycomb structure of the present invention.
Figure 7I:
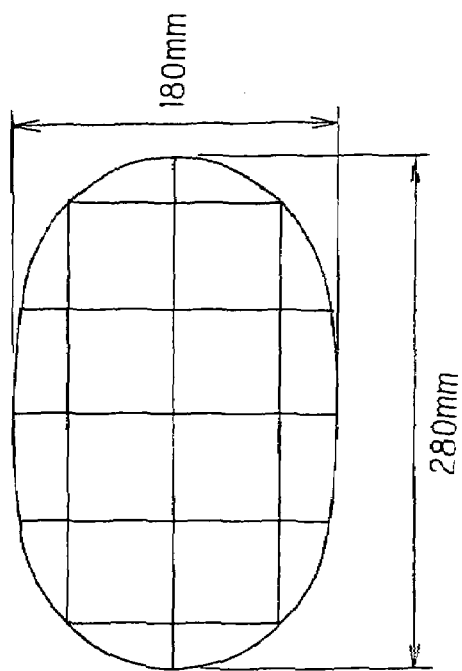
Figure 7F:
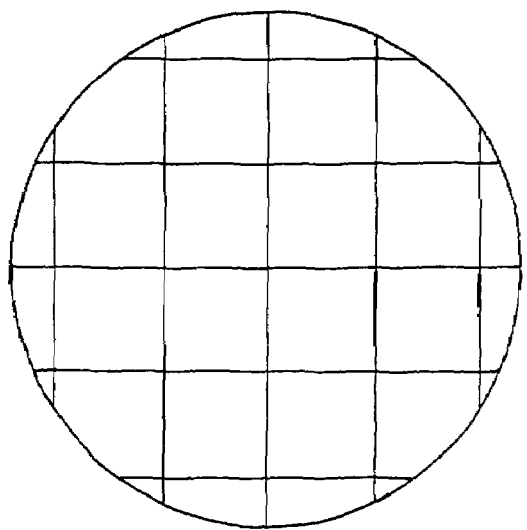
Figure 7H:
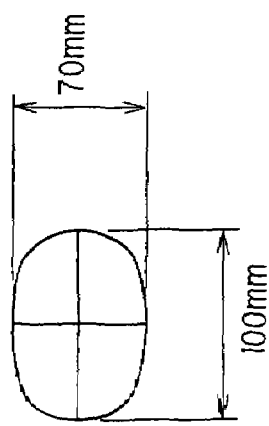
Figure 8K:
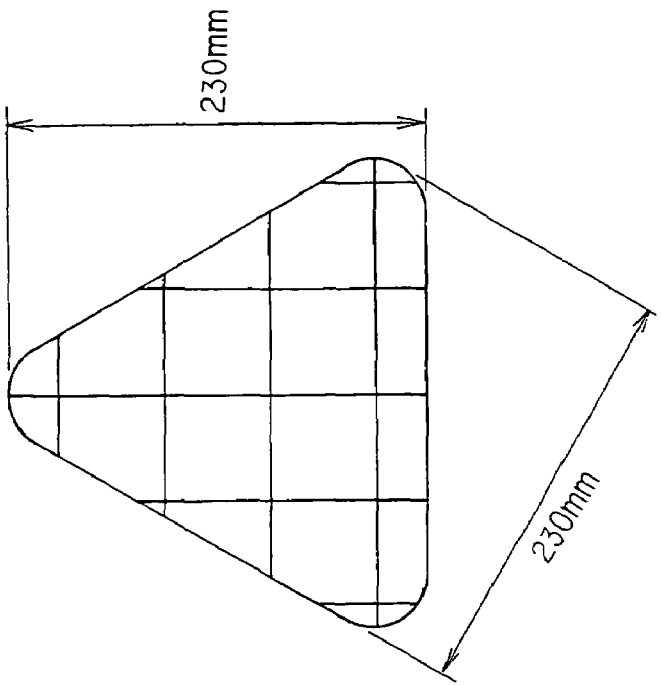
FIGS. 8(j) to 8(l) are each a sectional view showing an example of the sectional shape of the honeycomb structure of the present invention.
Figure 8J:
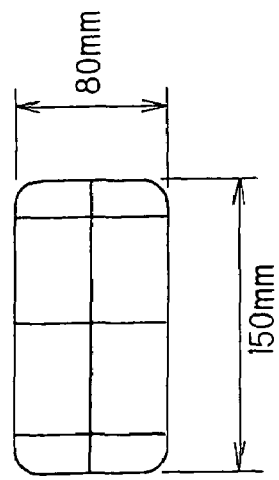
Figure 8L:
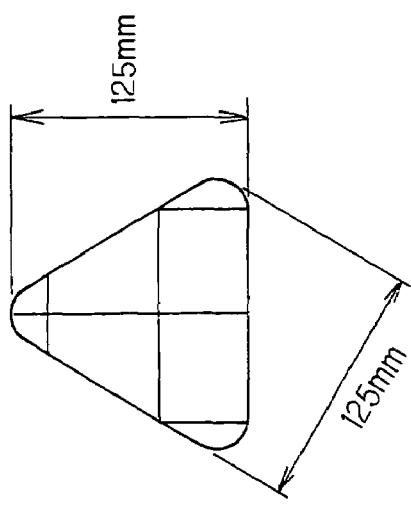
Figure 9N:
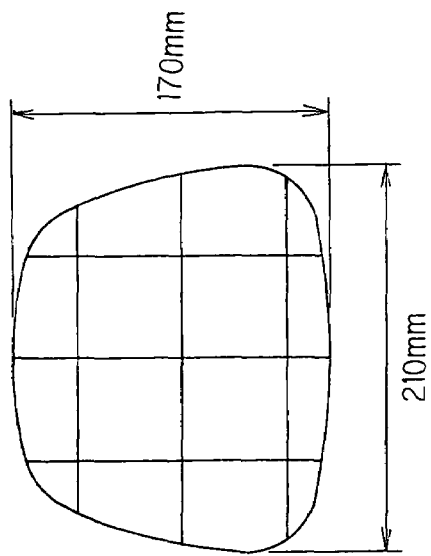
FIGS. 9(m) to 9(o) are each a sectional view showing an example of the sectional shape of the honeycomb structure of the present invention.
Figure 9M:
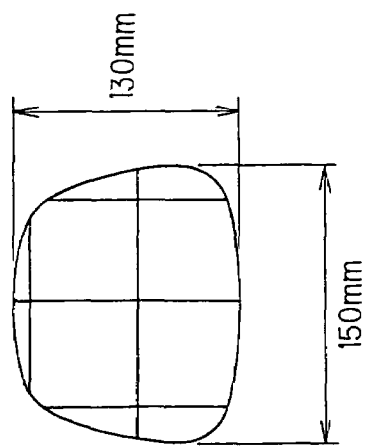
Figure 9O:
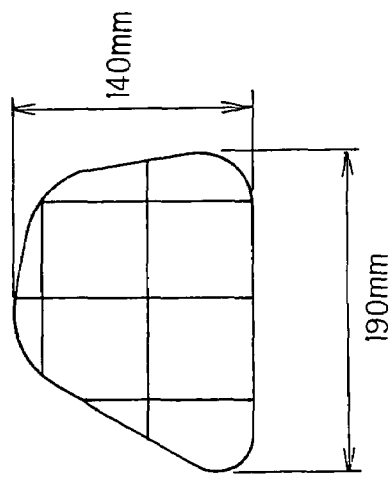
Figure 10:
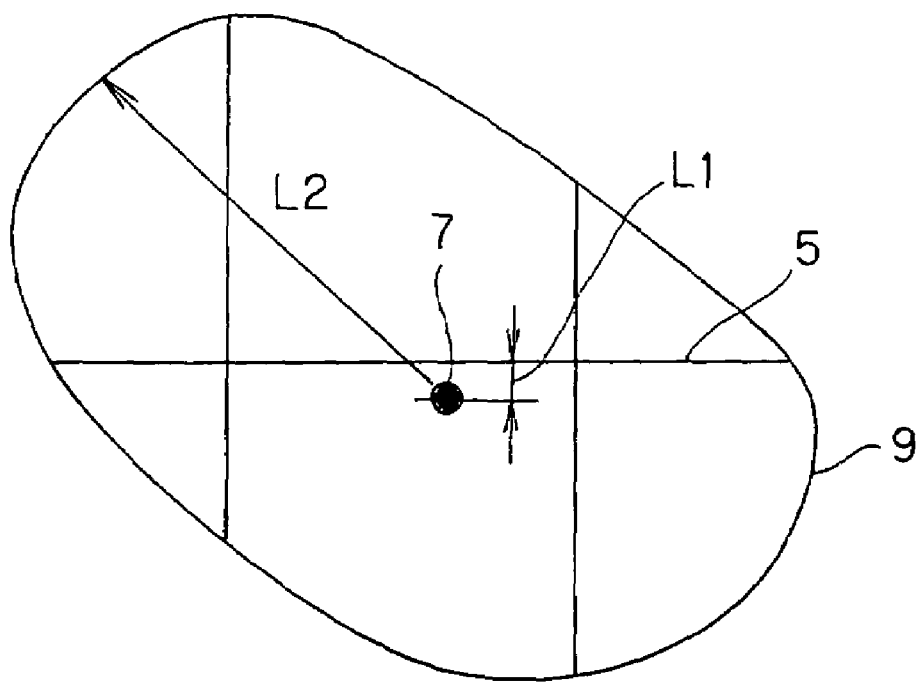
FIG. 10 is a sectional view showing an example of the sectional shape of the honeycomb structure of the present invention.
Figure 11R:
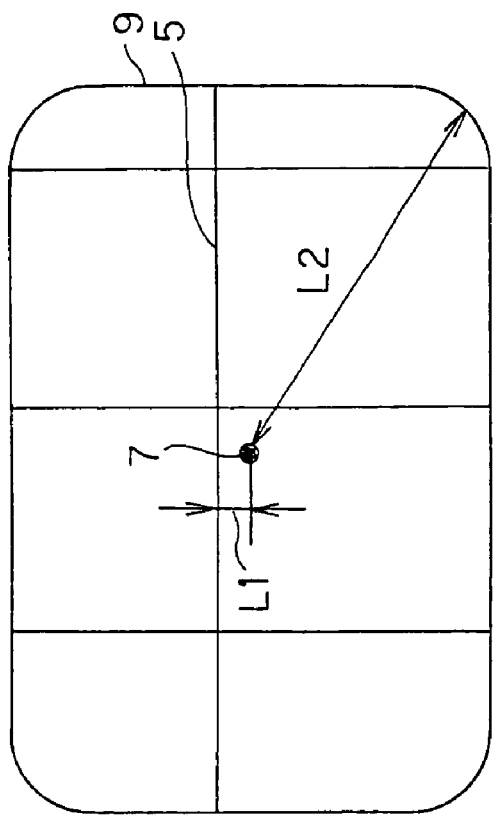
FIGS. 11(q) to 11(r) are each a sectional view showing an example of the sectional shape of the honeycomb structure of the present invention.
Figure 11Q:
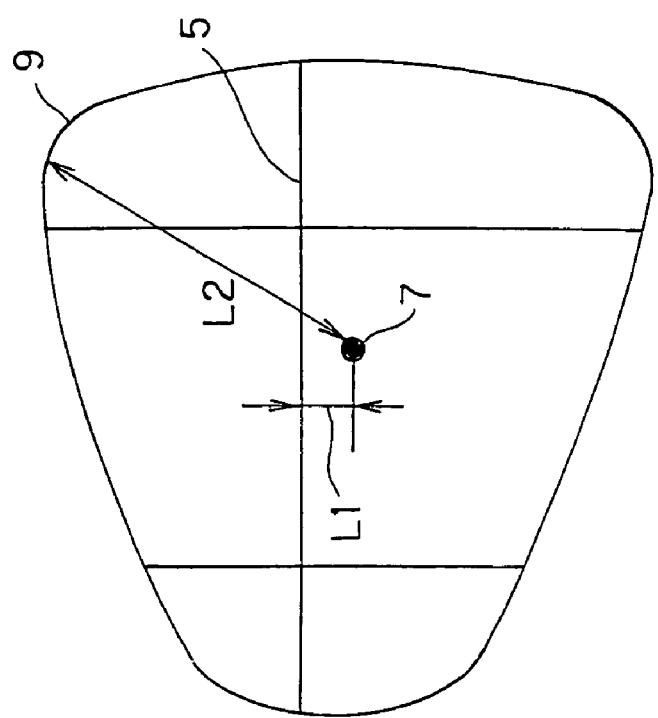

Each honeycomb segment 1 of the present invention has a number of through-holes 13 surrounded by partition walls 11 and extending in the axial direction (X direction), as shown in FIG. 4(a) and FIG. 4(b). The sectional shape (cell shape) of each through-hole 13 is preferably any of a triangle, a tetragon, a hexagon and a corrugation for easiness of honeycomb segment production. In FIG. 4(a) and FIG. 4(b), partition walls 11 and through-holes 13 are shown only at part of the top end of honeycomb segment; actually, however, the partition walls 11 and the through-holes 13 are present at the whole part of the top end.

The density of the cells formed by partition walls, i.e. the number of through-holes (cells) per unit area of section is preferably 6 to 2,000 cells/in.$^2$ (0.9 to 311 cells/cm$^2$), more preferably 50 to 400 cells/in.$^2$ (7.8 to 62 cells/cm$^2$). When the cell density is less than 6 cells/in.$^2$ (0.9 cells/cm$^2$), the honeycomb segment is insufficient in strength and effective GSA (geographical surface area); when the cell density is more than 2,000 cells/in.$^2$ (311 cells/cm$^2$), the honeycomb segment shows a large pressure loss when a gas flows therethrough.

The thickness of each partition wall 11 of the honeycomb segment 1 is preferably 50 to 2,000 μm. When the thickness of the partition wall is less than 50 μm, the honeycomb segment is insufficient in strength; when the thickness is more than 2,000 μm, the honeycomb segment is small in effective GSA and, moreover, shows a large pressure loss when a gas flows therethrough.

As to the sectional shape of each honeycomb segment, there is no particular restriction. It is preferred that the honeycomb segment has a basic tetragonal shape and the shapes of outermost honeycomb segments are matched to the shape of a honeycomb structure to be produced. It is also possible to allow each honeycomb segment to have a fan-shaped section, as shown in FIG. 4(a).

In the present invention, the main component of the honeycomb segment is preferred to comprise at least one kind of ceramic selected from the group consisting of cordierite, mullite, alumina, spinel, silicon carbide, silicon nitride, lithium aluminum silicate, aluminum titanate and combinations thereof, a Fe-Cr-Al type metal, or metallic Si and SiC, from the standpoint of strength, heat resistance, etc. of honeycomb segment. Silicon carbide which is high in thermal conductivity, is particularly preferred because it releases the heat easily. Here, the expression "main component" of honeycomb segment means a component constituting 80% by mass or more of the honeycomb segment.

In the present invention, the bonded areas 5 are formed by bonding honeycomb segments to each other. The thickness of the bonded areas 5 is preferably 0.5 to 6.0 mm, more preferably 0.5 to 3.0 mm, most preferably 0.5 to 2.0 mm. When the thickness of the bonded areas is too small, the bonding strength obtained is insufficient. When the thickness is too large, the pressure loss when a gas flows is large.

The main component of the adhesive forming the bonded areas can be selected from the above-mentioned materials suitable as the main component of honeycomb segment.

In the present invention, when each honeycomb segment and the adhesive are made of metallic Si and SiC, the Si content in the honeycomb segment, specified by Si/(Si+SiC) is preferably 5 to 50% by mass, more preferably 10 to 40% by mass. The reason is that when the Si content is less than 5% by mass, there is no effect of Si addition and, when the Si content is more than 50% by mass, it is impossible to obtain heat resistance and high thermal conductivity which are characteristics of SiC.

In this case, it is desired that the Si content of the adhesive, specified by Si/(Si+SiC) is equal to or higher than that of the honeycomb segment and is 10 to 80% by mass. When the Si content of the adhesive is lower than that of the honeycomb segment, no required bonding strength is obtained; when the Si content is higher than 80% by mass, no sufficient oxidation resistance is obtained at high temperatures.

When the honeycomb structure of the present invention is used as a catalyst carrier for purification of exhaust gas emitted from heat engine (e.g. internal combustion engine) or burner (e.g. boiler), or for reforming of liquid fuel or gaseous fuel, it is preferred to load, on the honeycomb structure, a catalyst, for example, a metal having a catalytic activity. As representative metals having a catalytic activity, there can be mentioned Pt, Pd and Rh. At least one kind of these metals is preferred to be loaded on the honeycomb structure.

Meanwhile, when the honeycomb structure of the present invention is used as a filter (e.g. a diesel particulate filter) for capturing and removing a particulate substance present in a particle-containing fluid, it is preferred that the individual honeycomb segments used therein has such a structure that the partition walls of through-holes have a filtration ability, given through-holes are plugged at one end of honeycomb segment, and the remainder through holes are plugged at the other end of honeycomb segment.

When a particle-containing fluid is introduced into the honeycomb structure constituted by such honeycomb segments, at its one end, the particle-containing fluid enters the inside of the honeycomb structure from those through-holes not plugged at the one end, passes through porous partition walls having a filtration ability, and enters those through-holes not plugged at the other end of honeycomb structure. When the particle-containing fluid passes through the partition walls, the particulate substance present in the fluid is captured by the partition walls, and the particulate substance-removed fluid is discharged from the other end of honeycomb structure.

When the honeycomb structure of the present invention is used as a filter, the captured particulate substance deposits on the partition walls. As the deposition proceeds, the filter is blocked and its function decreases; therefore, the honeycomb structure is heated periodically by a heating means such as a heater or the like to burn and remove the particulate substance and regenerate the filter function. In order to accelerate the burning of the particulate substance during the regeneration, the above-mentioned catalyst may be loaded on the honeycomb structure.

Next, description is made on the process for producing the honeycomb structure of the present invention. However, the process for producing the honeycomb structure of the present invention is not restricted thereto.

As a raw material powder for honeycomb segment, there is used an above-mentioned suitable material, for example, a mixed powder of SiC powder and metallic SiC powder. Thereto are added a binder, for example, methyl cellulose and hydroxypropoxymethyl cellulose. Further, a surfactant and water are added to produce a plastic material. This plastic material is subjected to extrusion molding to produce a plurality of honeycomb segments each having, for example, a partition wall thickness of 0.3 mm, a cell density of 31 cells/$cm^2$, and an after-assembling structure of FIG. 1.

These plurality of honeycomb segments are dried using, for example, a micro wave and hot air; then, an adhesive having, for example, the same composition as the above plastic material is coated on areas corresponding to the bonded areas 5 of FIG. 1, and the honeycomb segments are bonded; the resulting assembly is dried. The dried assembly is heated in, for example, a $N_2$ atmosphere for debinding and then fired in an inert atmosphere such as Ar or the like, whereby a honeycomb structure of the present invention can be obtained.

In the present invention, in order to bond honeycomb segments, there is used the above-mentioned method of coating an adhesive on given areas to be bonded. Alternatively, it is possible to use a plate of given thickness made of an adhesive and bond honeycomb segments using this plate and an adhesive already coated on the segments. This method is preferred for securing a required thickness.

A honeycomb structure having through-holes plugged at either one end can be produced by producing a honeycomb structure by the above method and then plugging the through-holes alternately at each end of the honeycomb structure.

Loading of a catalyst on the thus-produced honeycomb structure can be conducted by a method ordinarily used by those skilled in the art. For example, a catalyst slurry is wash-coated on a honeycomb structure and the resulting material is dried and fired, whereby a catalyst can be loaded.

The present invention is described in more detail below by way of Examples. However, the present invention is in no way restricted to these Examples.

EXAMPLE 1

There was used, as a raw material, a mixed powder consisting of 75% by mass of a SiC powder and 25% by mass of a metallic Si powder. Thereto were added methyl cellulose, hydroxypropoxymethyl cellulose, a surfactant and water to produce a plastic material. This plastic material was subjected to extrusion molding to obtain a plurality of honeycomb segments each of 0.30 mm in partition wall thickness, 300 cells/in.$^2$ (46.50 cells/cm$^2$) in cell density and 55 mm in length of one side.

These honeycomb segments were dried using a micro wave and hot air and then bonded using an adhesive which was a mixture of a ceramic fiber, a ceramic powder, an organic binder and an inorganic binder, whereby was assembled a cylindrical honeycomb structure of 144 mm in diameter and 153 mm in height, having a sectional shape of FIG. 3 and a thickness of 1 mm in bonded areas 5. The honeycomb structure was dried, heated at about 400° C. in a $N_2$ atmosphere for debinding, and fired at about 1,550° C. in an Ar atmosphere to obtain a ceramic structure.

COMPARATIVE EXAMPLE 1

Figure 12:
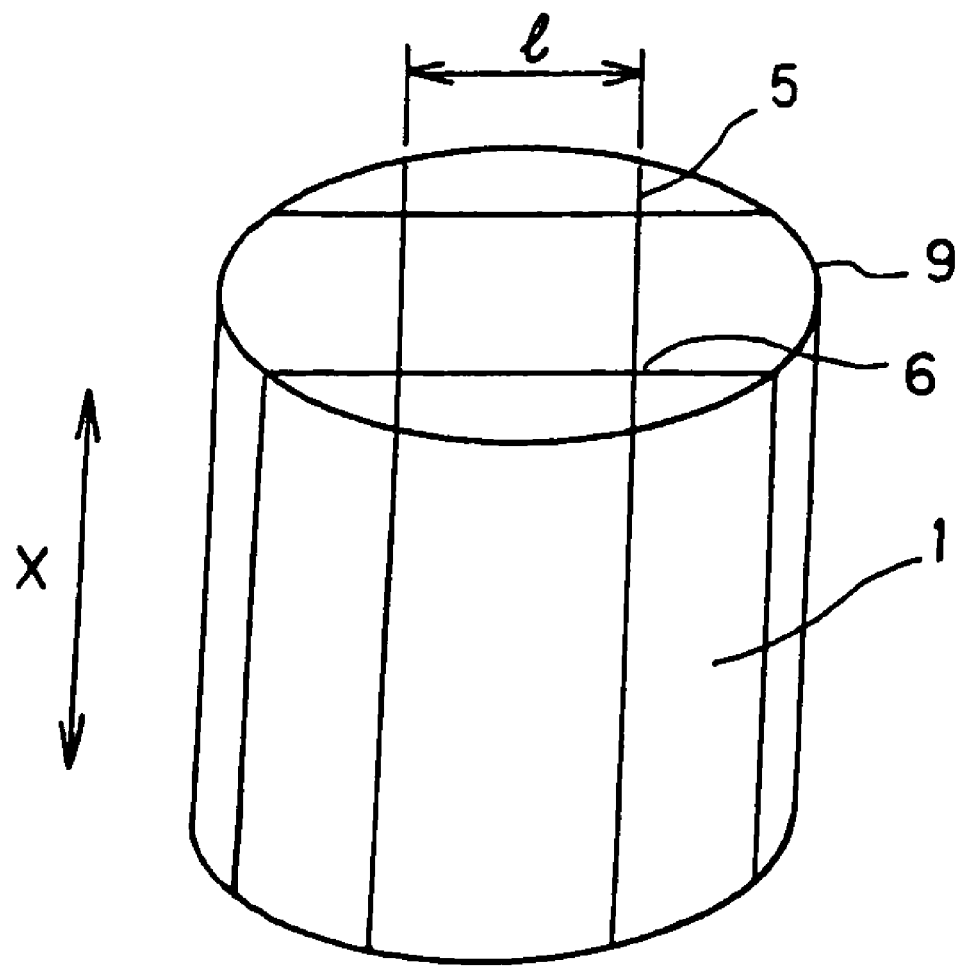
FIG. 12 is a perspective view showing a conventional honeycomb structure produced in Comparative Example 1.

A honeycomb structure was obtained in the same manner as in Example 1 except that the positions of bonded areas 5 were changed as shown in FIG. 12.

(Regeneration test 1)

A ceramic-made non-intumescent mat as a holding material was wound round the circumference (side) of each of the honeycomb structures obtained in Example 1 and Comparative Example 1. Each of the mat-wound honeycomb structures was stuffed in a SUS 409-made casing, to prepare a canned structure. A soot-containing combustion gas generated by combustion of a diesel gas oil was allowed to flow into each canned structure from its lower end [the bottom end in FIG. 1 or 12 (not shown)] and leave from the upper end (the top end in FIGS. 1 or 12), whereby the soot was captured inside the honeycomb structure. The honeycomb structure was then cooled to room temperature, after which a combustion gas containing a given proportion of oxygen was allowed to flow into the honeycomb structure at 650° C. from its lower end to burn and remove the soot. Thus, a filter regeneration test was carried out.

The weight of captured soot was changed from 10 g/l (liter) to 16 g/l and generation of cracks in the honeycomb structure after filter regeneration test was examined visually. The results are shown in Table 1. The honeycomb structure obtained in Example 1 generated no cracks up to a soot amount of 14 g/l, while the honeycomb structure obtained in Comparative Example 1 generated cracks at a soot amount of 12 g/l.

TABLE 1

| | L1 (mm) | L2 (mm) | L1/L2 | Presence of cracks Soot amount | | | |
|---|---|---|---|---|---|---|---|
| | | | | 10 g/l | 12 g/l | 14 g/l | 16 g/l |
| Example 1 | 0 | 72 | 0 | No | No | No | Yes |
| Comparative Example 1 | 27.5 | 72 | 1/2.6 | No | Yes | — | — |

EXAMPLES 2 to 6

(Regeneration test 2)

Honeycomb structures were produced in the same manner as in Example 1 except that the positions of gravity center and bonded areas in section were slightly changed and the shortest distance L1 was changed to 1.80 mm, 3.60 mm, 7.20 mm, 10.8 mm or 14.4 mm. A test was conducted in the same manner as in the regeneration test 1. The results are shown in Table 2.

TABLE 2

| | L1 (mm) | L2 (mm) | L1/L2 | Presence of cracks Soot amount | | | |
|---|---|---|---|---|---|---|---|
| | | | | 10 g/l | 12 g/l | 14 g/l | 16 g/l |
| Example 2 | 1.8 | 72 | 1/40 | No | No | No | Yes |
| Example 3 | 3.6 | 72 | 1/20 | No | No | No | Yes |
| Example 4 | 7.2 | 72 | 1/10 | No | No | No | Yes |
| Example 5 | 10.8 | 72 | 1/6.7 | No | No | Yes | Yes |
| Example 6 | 14.4 | 72 | 1/5 | No | No | Yes | Yes |

As is clear from Table 2, there was an increase in the soot amount at which no cracks generated, i.e. critical soot amount, when L1/L2 was 1/10 or smaller.

Simulation of thermal stress

Figure 17:
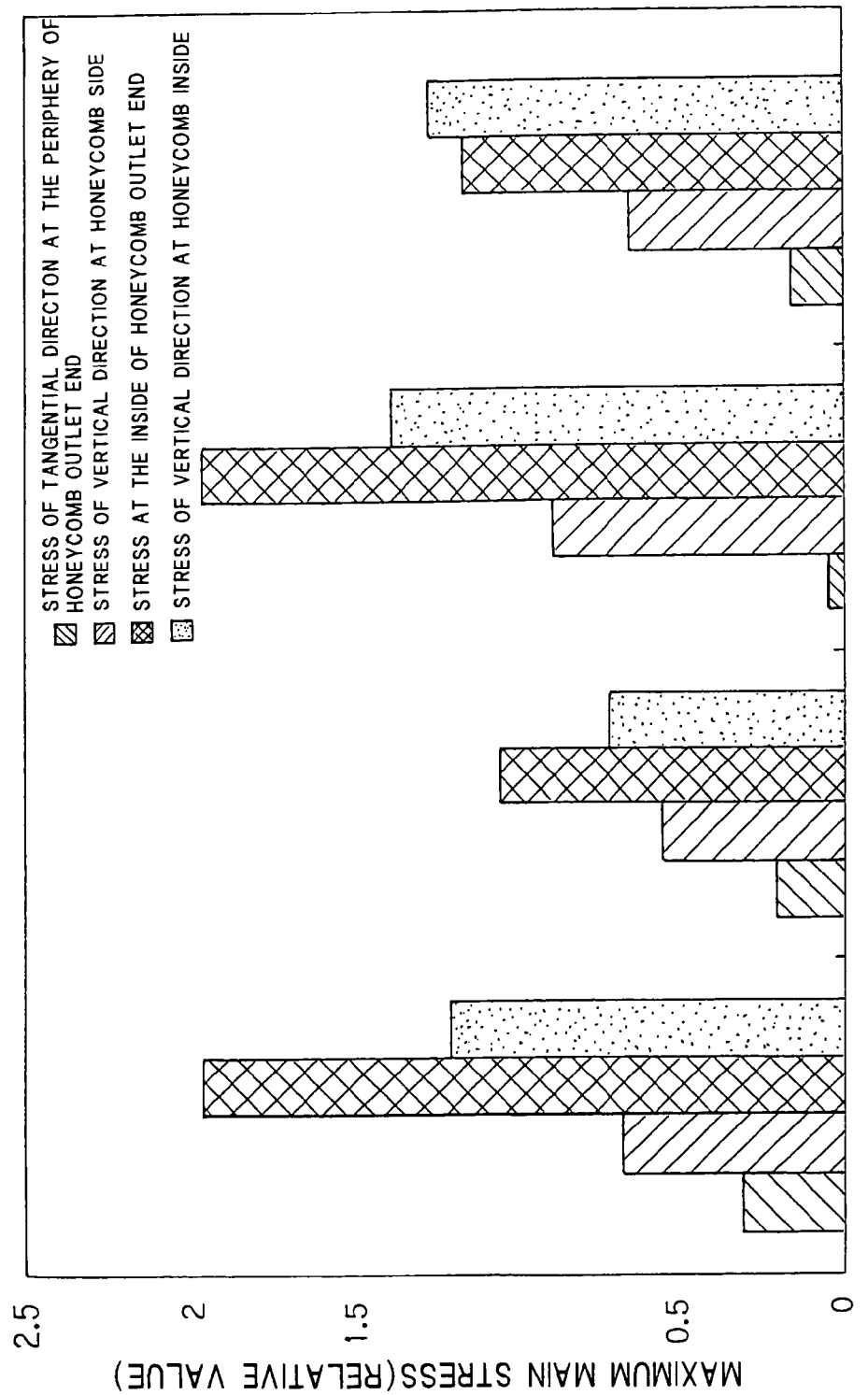
FIG. 17 is a graph showing the results of calculation of the thermal stresses made in a regeneration test.

Four definite element models shown in FIG. 13(a) to FIG. 16(b) were produced. For these models, the temperature distributions during the regeneration test were determined by numerical analysis and, using the data, thermal stresses were calculated. The results are shown in FIG. 17. The numerical analysis of temperature distribution was made by conducting a calculation for a case wherein when a gas of 650° C. was passed under a state that soot of 14 g/l had adhered to the model-inside carrier uniformly. Also in the definite element analysis, there were used, as the properties of material, the measured data of the sample of Example 1.

Figure 13A:
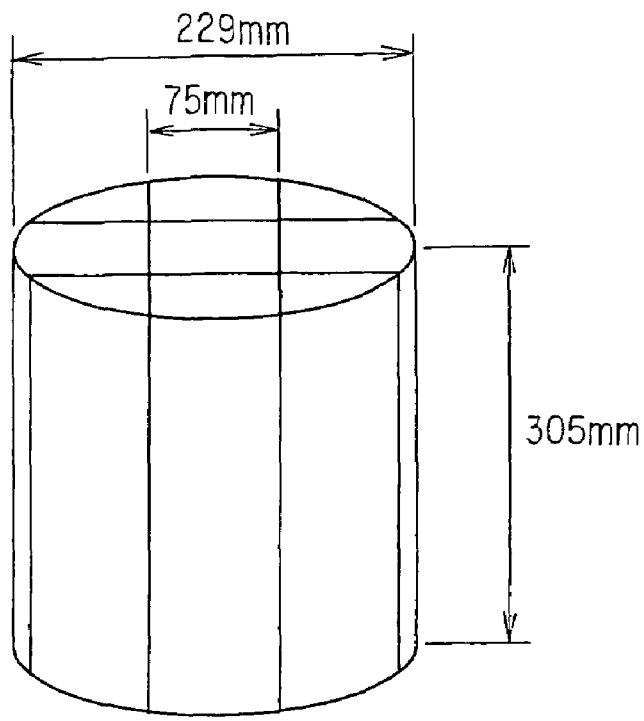
FIGS. 13(a) and 13(b) show a honeycomb structure, Model 1, used in calculation of the thermal stress appearing during a regeneration test, using a finite element method.
Figure 13B:
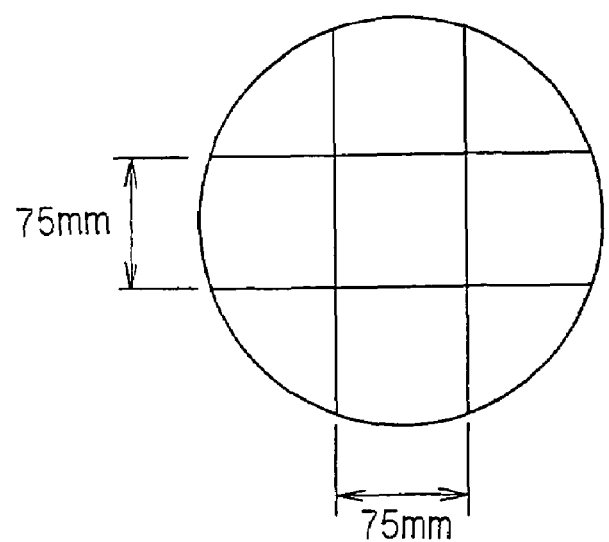
Figure 14A:
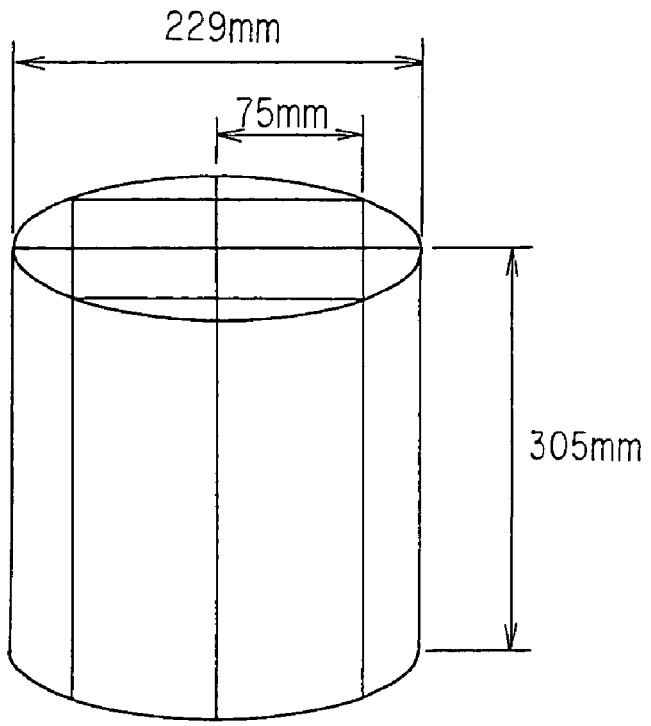
FIGS. 14(a) and 14(b) show a honeycomb structure, Model 2, used in calculation of the thermal stress appearing during a regeneration test, using a finite element method.
Figure 14B:
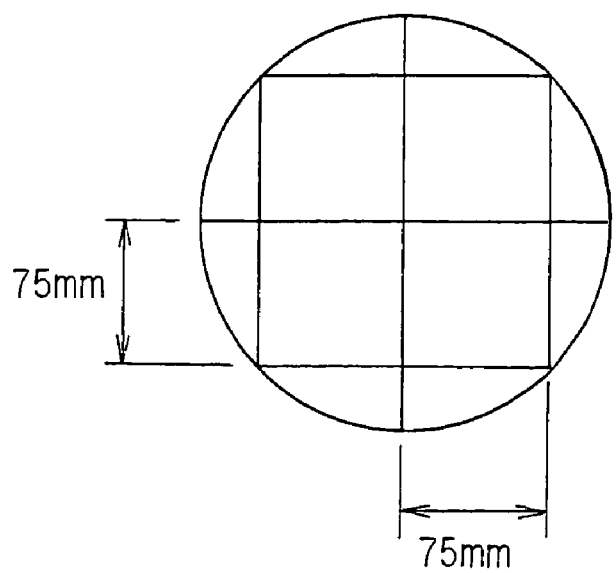
Figure 15A:
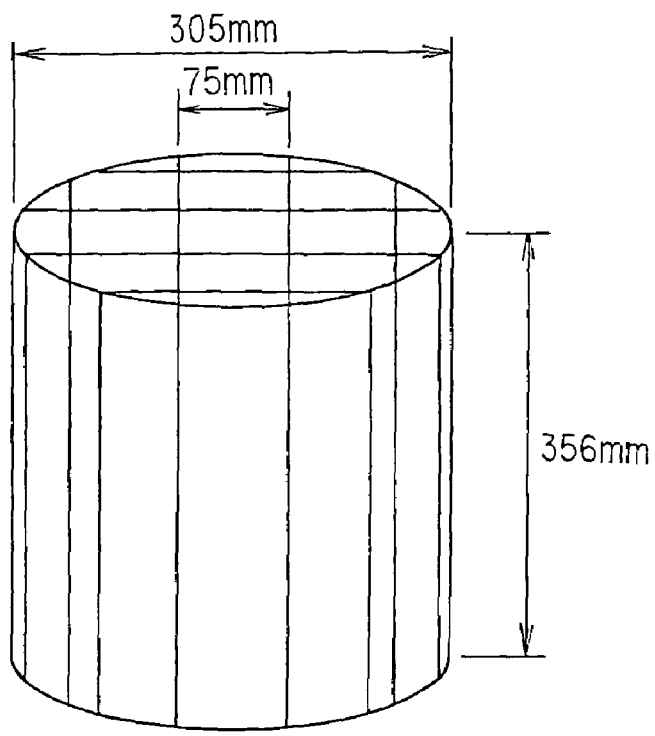
FIGS. 15(a) and 15(b) show a honeycomb structure, Model 3, used in calculation of the thermal stress appearing during a regeneration test, using a finite element method.
Figure 15B:
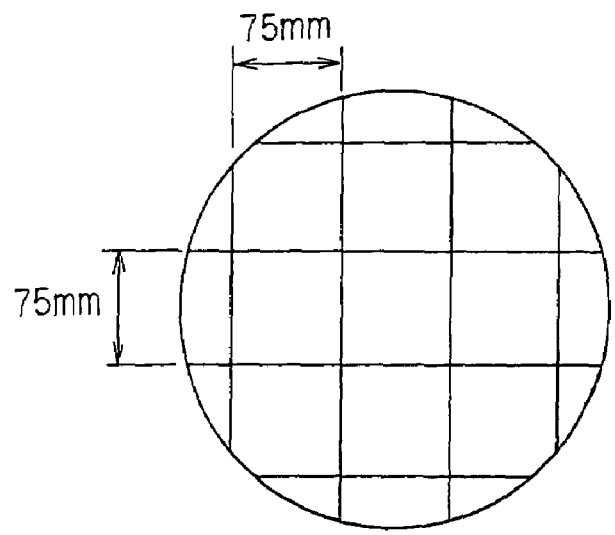
Figure 16A:
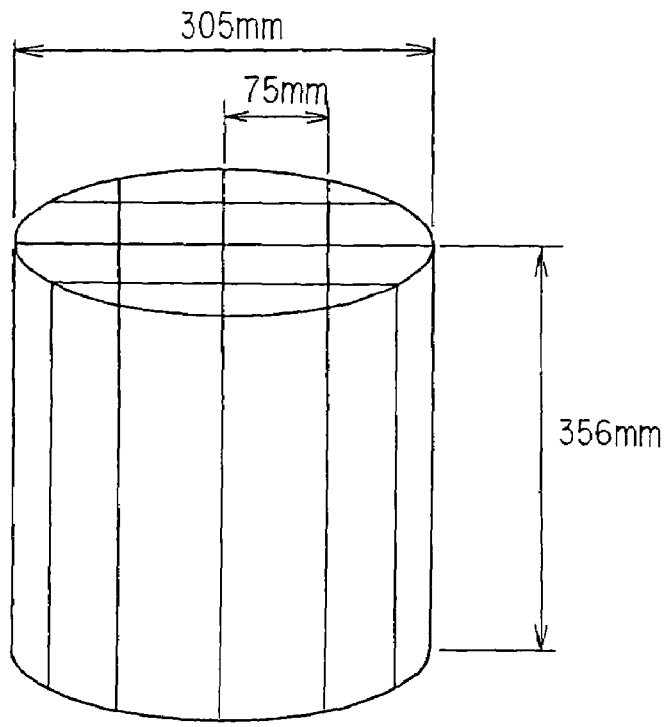
FIGS. 16(a) and 16(b) show a honeycomb structure, Model 4, used in calculation of the thermal stress appearing during a regeneration test, using a finite element method.
Figure 16B:
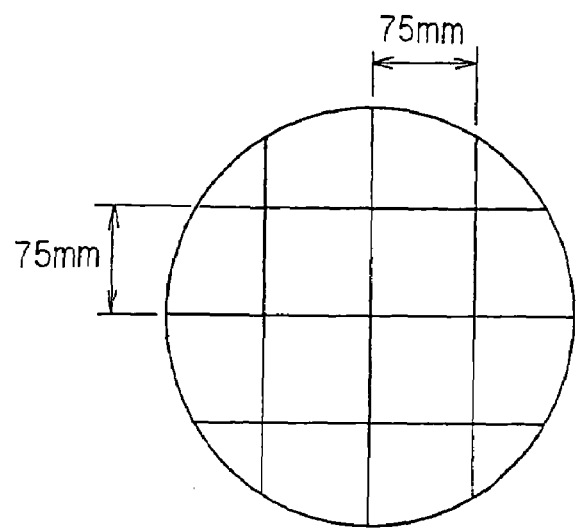

The model 1 [FIGS. 13(a) and 13(b)] and the model 3 [FIGS. 15(a) and 15(b)] are models in which the gravity center is at the sectional center of honeycomb structure and L1/L2 is 1/3.1 and 1/4.1, respectively. The model 2 [FIGS. 14(a) and 14(b)] and the model 4 [FIGS. 16(a) and 16(b)] are models in which the bonded areas pass the gravity center, that is, L1 is 0 (zero). It is clear from FIG. 17 showing the results of simulation that the thermal stresses of the structures of the present invention (the models 2 and 4) are smaller than those of other structures (the models 1 and 3).

INDUSTRIAL APPLICABILITY

As described above, according to the honeycomb structure of the present invention, the thermal stress appearing during the use, particularly during the regeneration when local heating tends to arise, can be made small; accordingly, generation of cracks can be prevented.

The invention claimed is:

1. A honeycomb structure comprising:
   a plurality of honeycomb segments each having a large number of through-holes surrounded by partition walls and extending in an axial direction; and
   wherein the segments are bonded at the sides of the honeycomb, the segments parallel to said axial direction and integrated;
   wherein a section perpendicular to said axial direction includes a shortest distance (L1) from a gravity center of the section to the bonded areas of honeycomb segments in the section that is 1/10 to 1/40 of a largest distance (L2) from the gravity center of the section to a circumference of the section; and
   wherein the section perpendicular to said axial direction has an asymmetric conformation.

2. A honeycomb structure according to claim 1, wherein the shortest distance (L1) is 1/10 to 1/30 of the largest distance (L2).

3. A honeycomb structure according to claim 1, wherein a main component of each honeycomb segment comprises at least one kind of ceramic selected from a group consisting of cordierite, mullite, alumina, spinel, silicon carbide, silicon nitride, lithium aluminum silicate, aluminum titanate and combinations thereof, a Fe-Cr-Al type metal, or metallic Si and SiC.

4. A honeycomb structure according to claim 1, wherein the honeycomb segments have a catalyst loaded thereon.

5. A honeycomb structure according to claim 4, wherein the catalyst is at least one kind selected from Pt, Pd and Rh.

6. A honeycomb structure according to claim 1, wherein the through-holes of the honeycomb segments have a sectional shape of any of a triangle, a tetragon and a hexagon.

7. A honeycomb structure according to claim 1, wherein in each honeycomb segment, partition walls surrounding through-holes have a filtration ability, given through-holes are plugged at one end of the honeycomb segment, and residual through-holes are plugged at the other end of the honeycomb segment.

8. A honeycomb structure according to claim 7, wherein the honeycomb structure is a filter capable of capturing and removing a particulate substance present in a particle-containing fluid.

9. A honeycomb structure according to claim 1, wherein areas where the segments are bonded have thicknesses of from 0.5 mm to 6.0 mm.

* * * * *